Jan. 8, 1929.
E. J. BRASSEUR ET AL
1,698,491
METHOD AND APPARATUS FOR PRODUCING COLORED GLASS
Filed March 25, 1927
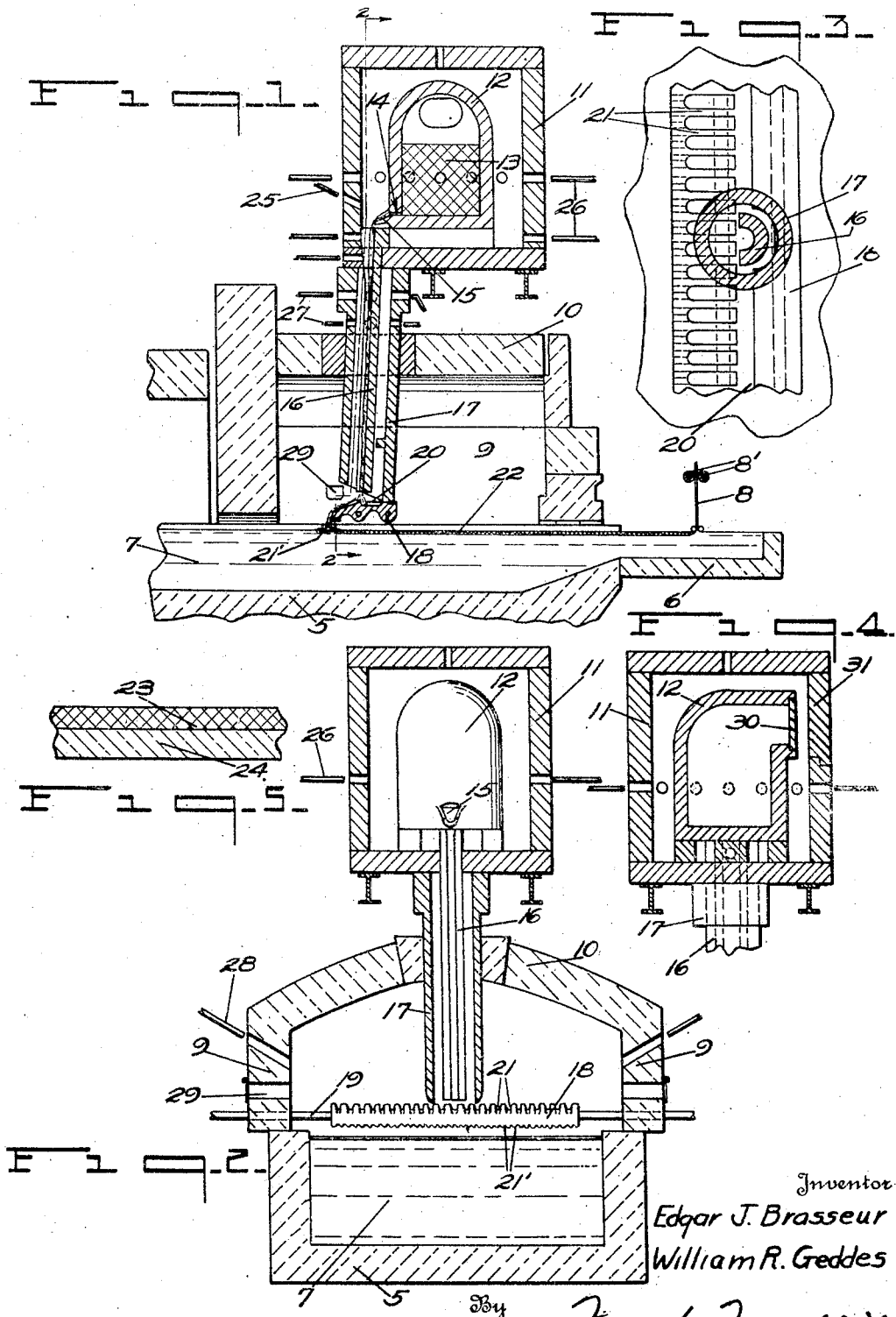
Inventor
Edgar J. Brasseur
William R. Geddes
By Frank Fraser
Attorney Patented Jan. 8, 1929.

1,698,491

UNITED STATES PATENT OFFICE.

EDGAR J. BRASSEUR AND WILLIAM R. GEDDES, OF CHARLESTON, WEST VIRGINIA, ASSIGNORS TO THE LIBBEY-OWENS SHEET GLASS COMPANY, OF TOLEDO, OHIO, A CORPORATION OF OHIO.

METHOD AND APPARATUS FOR PRODUCING COLORED GLASS.

Application filed March 25, 1927. Serial No. 178,172.

This invention relates broadly to the art of glass manufacture and particularly to an improved method and apparatus for producing colored glass.

An important object of the invention is to provide improved apparatus for producing colored glass wherein the said glass is adapted to be drawn in the form of a continuous ribbon.

Another object of the invention is to provide improved apparatus for producing colored glass including means for flowing the colored glass upon the surface of a moving body of plain glass and then drawing this glass in sheet form.

A further object of the invention is to provide improved apparatus for producing colored glass including means for flowing a thin layer of colored glass or flashing upon the surface of a moving body of ordinary, more or less colorless glass and then drawing a continuous sheet from the body of glass which is colored on one side and plain on the other.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical sectional view through improved apparatus constructed in accordance with the present invention.

Fig. 2 is a sectional view taken on line 2—2 of Fig. 1.

Fig. 3 is a detail top plan view of the colored glass or flashing distributing member.

Fig. 4 is a detail sectional view of the flash pot and housing therefor, and

Fig. 5 is a detail section of the finished colored glass.

In accordance with the Colburn process for drawing sheet glass, the raw ingredients or glass batch is introduced and melted within the melting end of a continuous tank furnace after which the molten glass is adapted to flow towards the forward end of the furnace into a refining chamber and then through a cooling chamber into a shallow receptacle or draw-pot from which it is drawn away in sheet form. While the present invention has been disclosed in the drawings in connection with such a process, it is to be understood that it is to be restricted to use in connection with this particular process or the particular type of furnace illustrated.

In the drawings, the numeral 5 designates the cooling chamber of a continuous tank furnace and 6 the draw-pot in open communication therewith. The cooling chamber 5 is supplied with ordinary more or less colorless molten glass 7 from the melting end of the furnace and this glass flows into the draw-pot 6 and is adapted to be drawn away in sheet form as indicated at 8 by suitable drawing means 8'. The cooling chamber 5 includes side walls 9 and a cover arch 10.

Supported above the cooling chamber 5 is a housing 11 within which is arranged the flash pot 12 adapted to contain the colored glass or flashing 13. The flash pot 12 is provided adjacent its bottom with an opening 14 and arranged beneath this opening and outwardly thereof is a lip 15 over which the flashing 13 is adapted to flow from the pot 12. The bottom of the housing 11 is provided with an opening and projecting upwardly therethrough and terminating directly beneath the lip 15 is a flash chute 16 surrounded by a casing 17. This chute 16 is positioned in direct alignment with the flow lip 15 and is adapted to receive the colored glass or flashing flowing thereover from the pot 12.

The chute 16 and casing 17 project downwardly through the cover-arch 10 of the cooling chamber 5 and terminate adjacent the surface of the molten glass 7. Arranged beneath the chute 16 is a distributing member 18 supported upon rods 19 which extend outwardly through openings in the side walls 9 of the cooling chamber 5. This distributing member 18 extends transversely over the molten glass 7 and is formed in its upper surface with a longitudinally extending supply channel 20 from which extend a plurality of spaced lateral feed channels 21. The bottom of the member 18 is provided at the outer ends of the feed channels 21 with teeth 21'.

In the operation of the invention, the colored glass or flashing 13 contained within the flash pot 12 is adapted to flow therefrom over the lip 15 and down the chute 16 into the supply channel 20 of the distributing member 18. This molten flashing then flows through the lateral feed channels 21 onto the upper surface of the body of molten glass 7. The distributing member 18 is so constructed as to maintain an even flow of flashing over the full width of the molten glass 7. That is to say, the flashing will drip from the points of the teeth 21' and thus be evenly distributed.

Were these teeth not provided, the colored glass would be liable to run to one end or the other of the distributing member if not absolutely horizontal.

The flashing forms a thin layer of colored glass 22 upon the surface of the plain or colorless body of glass 7 and flows along with this glass into the draw-pot 6 from which it is drawn away in the sheet indicated at 8. In the drawing of the sheet one side thereof is supplied with colored glass while the opposite side is supplied with ordinary more or less colorless glass with the result that the finished sheet will consist of two layers, namely a colored layer 23 and a plain layer 24 as shown in Fig. 5.

A burner or cooler 25 can be provided to control the flow of the colored glass or flashing from the pot 12. In other words, a cooler can be used to freeze the flashing during the melting thereof within the pot and this cooler can then be replaced by a burner when it is desired to make the flashing flow. The melting of the flashing within the pot 12 can be accomplished by providing a sufficient number of burners 26 and the condition of the flow of the flashing over the lip 15 can be observed through the burner or peep holes. Burners 27 can also be provided for controlling the flow of the colored glass or flashing down the chute 16 and burners 28 can be provided in the side walls of the cooling chamber 5 for maintaining the flow of flashing on the distributing member 18 sufficiently fluid. The flow of flashing on the distributing member can be observed through suitable peep holes 29. In order to fill or recharge the flash pot 12, the same can be provided with an opening closed by a removable cover or plate 30 and the housing with a removable section 31. Thus, when the plate 30 and section 31 are removed, the pot can be easily and quickly filled or recharged with colored glass.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. Apparatus for producing colored glass, including means for flowing a layer of colored glass on top of a horizontally arranged body of plain glass, and means for drawing from said body a continuous sheet of colored glass.

2. Apparatus for producing colored glass, including means for flowing a layer of colored glass upon the surface of a body of ordinary more or less colorless glass moving in a substantially horizontal plane, and means for drawing from said body a glass sheet which is plain on one side and colored on the other.

3. Apparatus for producing colored glass, including means for flowing a layer of colored glass upon the surface of a horizontally moving body of ordinary more or less colorless glass, means for distributing the colored glass over the surface of the colorless glass, and means for drawing from said body a colored glass sheet.

4. The combination with a glass melting furnace, including a chamber adapted to contain a supply of ordinary more or less colorless molten glass, and a draw-pot in open communication therewith adapted to receive the molten glass therefrom, of means for flowing a layer of colored glass upon the surface of the colorless glass as it flows through said chamber, and means for drawing from the draw-pot a glass sheet plain on one side and colored on the other.

5. The combination with a glass melting furnace, including a chamber adapted to contain a supply of ordinary more or less colorless molten glass, and a draw-pot in open communication therewith adapted to receive the molten glass therefrom, of means for flowing a layer of colored glass upon the surface of the molten colorless glass as it flows through said chamber, means for distributing the colored glass over the surface of the colorless glass, and means for drawing from the draw-pot a glass sheet plain on one side and colored on the other.

6. The combination with a glass melting furnace, including a chamber containing a supply of ordinary more or less colorless molten glass, and a draw-pot arranged in open communication with said chamber for receiving the molten glass therefrom, of means supported above the plane of said chamber and adapted to contain a supply of colored glass or flashing, means for receiving the flashing from said first means and distributing it upon the surface of the colorless molten glass within said chamber as it flows therethrough, and means for drawing from the draw-pot a continuous sheet of colored glass.

7. The combination with a glass melting furnace, including a cooling chamber containing a supply of ordinary more or less colorless glass, and a draw-pot arranged in open communication with said cooling chamber for receiving the molten glass therefrom, of means supported above the plane of the cooling chamber and adapted to contain a supply of colored glass or flashing, means for receiving the flashing from said containing means, means for receiving the flashing from the second means and distributing it upon the surface of the colorless molten glass within the cooling chamber as the same flows therethrough, and means for drawing from the draw-pot a continuous sheet of colored glass.

8. The combination with a glass melting furnace, including a cooling chamber containing a supply of ordinary more or less colorless molten glass, and a draw-pot arranged in open communication with said cooling chamber for receiving the molten glass therefrom, of a receptacle supported above the place of the cooling chamber and adapted to contain a supply of colored glass or flashing, a chute for receiving the flashing from said receptacle, a distributing member positioned at the lower end of the chute for receiving the flashing therefrom and distributing it transversely upon the surface of the colorless molten glass within the cooling chamber as the said glass flows therethrough, and means for drawing from the draw-pot a continuous sheet of colored glass.

9. The combination with a glass melting furnace, including a cooling chamber containing a supply of ordinary more or less colorless molten glass, and a draw-pot arranged in open communication with said cooling chamber for receiving the molten glass therefrom, of means for containing a supply of molten glass therefrom, of means for containing a supply of colored glass or flashing, means positioned above the colorless molten glass closely adjacent thereto for distributing the flashing upon the surface thereof, means for conveying the flashing from the containing means to the distributing means, and means for drawing from the draw-pot a continuous colored sheet.

10. The method of producing colored glass which consists in flowing a layer of flashing upon the surface of a horizontally moving body of more or less colorless glass and then drawing a colored sheet from said body.

11. The method of producing colored glass which consists in flowing a layer of flashing upon the surface of a horizontally moving body of ordinary more or less colorless glass, flowing the layer of flashing upon and along with the body of colorless glass, and then drawing from said body a continuous glass ribbon which is plain on one side and colored on the other.

12. The method of producing colored glass which consists in flowing a layer of flashing upon the surface of a horizontally moving body of ordinary more or less colorless glass, distributing the flashing evenly over the surface of the colorless glass, flowing the layer of flashing upon and along with the body of colorless glass, and then drawing from said body a continuous glass ribbon which is plain on one side and colored on the other.

13. Apparatus for producing colored glass, including means for flowing a layer of colored glass upon a body of plain glass, and means for drawing a vertical sheet of colored glass from said body.

14. Apparatus for producing colored glass, including means for flowing a layer of colored glass upon the surface of a moving body of ordinary more or less colored glass, and means for drawing upwardly from said body a glass sheet which is plain on one side and colored on the other.

15. In sheet glass apparatus, a furnace containing a mass of relatively clear molten glass, a draw-pot associated therewith and adapted to receive glass therefrom, means for depositing a layer of colored glass upon the surface of the glass in said furnace, said layer being moved along on top of the molten glass flowing into the draw-pot, and means for drawing a sheet from the glass in the draw-pot, the sheet containing a portion of the clear glass and a portion of the colored glass.

16. In sheet glass apparatus, a furnace containing a mass of relatively clear molten glass, a draw-pot associated therewith and adapted to receive glass therefrom, means for depositing a layer of colored glass upon the surface of the glass in said furnace, said layer being moved along on top of the molten glass flowing into the draw-pot, and means for drawing upwardly a sheet from the glass in the draw-pot, the sheet containing a portion of the clear glass and a portion of the colored glass.

17. The process of producing colored glass consisting in flowing a layer of flashing upon the surface of a moving body of more or less colorless glass, and then drawing upwardly therefrom a colored sheet from said body.

Signed at Charleston, in the county of Kanawha, and State of West Va., this 14th day of March, 1927.

EDGAR J. BRASSEUR.
WILLIAM R. GEDDES.